Jan. 18, 1938.   H. BECKER   2,105,630
PHOTOGRAPHIC FILM CAMERA
Filed March 18, 1936
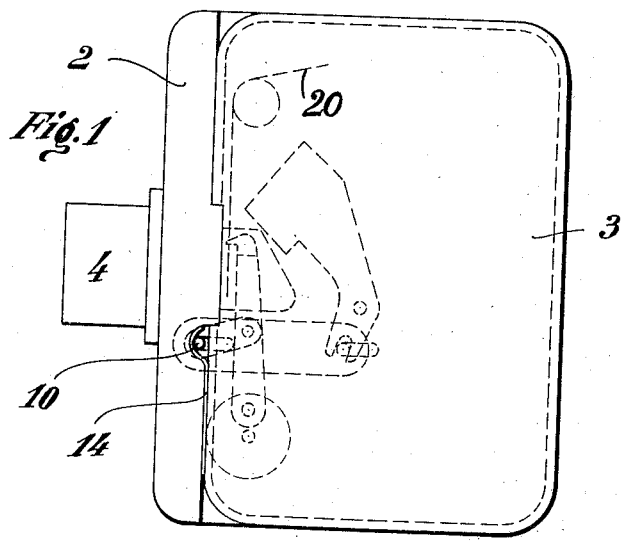
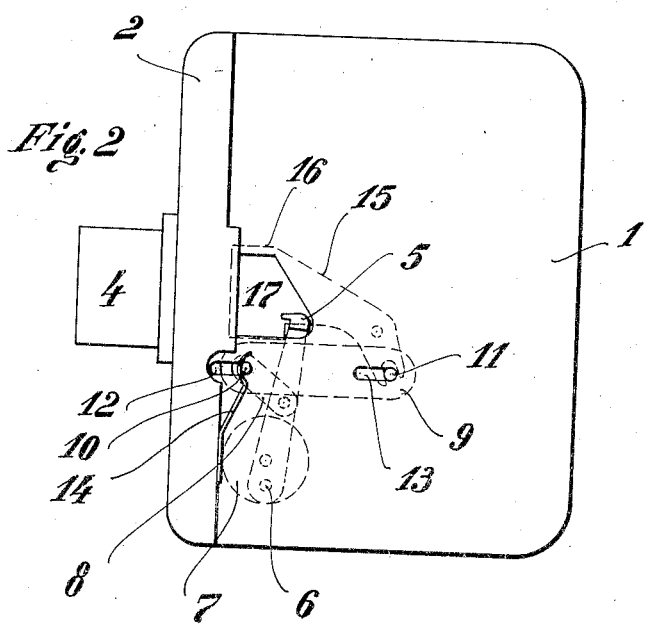
Helmut Becker
INVENTOR
BY
Ivan E. A. Konigsberg
ATTORNEY Patented Jan. 18, 1938

2,105,630

UNITED STATES PATENT OFFICE 2,105,630

PHOTOGRAPHIC FILM CAMERA

Helmut Becker, Wetzlar, Germany, assignor to Ernst Leitz, G. m. b. H., Wetzlar, Germany Application March 18, 1936, Serial No. 69,506
In Germany March 18, 1935

5 Claims. (Cl. 88—18.4)

This invention relates to improvements in the film feeding mechanism of moving picture cameras. In some types of moving picture cameras the film is operated by a film feeding pawl or film feeder which is removed from operating position in order to facilitate the loading of the camera with film. Thereafter the feeder must of course be moved back into operative position. These movements of the feeder have heretofore been accomplished by means of a special handle. It sometimes happens that the photographer forgets to operate the feeder handle after the camera has been loaded so that when the film movement is started troubles appear causing spoilage and the like.

The object of this invention is to provide a novel form of film pawl operating mechanism so arranged that the film pawl is automatically moved out of and into operating position when the film casette is detached or attached to the camera. In the accompanying drawing Fig. 1 is a diagrammatic plan view of a moving picture camera with the casette attached showing the film pawl in operating position.

Fig. 2 is a similar view showing the camera without the casette and with the feeder pawl in inoperative position.

In the drawing the camera 1 has an upstanding front portion 2 behind which the casette 3, Figure 1, is positioned while the camera is operated. 4 is the camera objective. The film 20 is operated by a film pawl 5 which is pivoted at 6 to a rotatable disk 7. The pawl is connected by a link 8 to a slide 9 which carries two pins 10 and 11 which move in slots 12 and 13 in the upper wall of the camera. The pin 10 is engaged by the casette 3 to move the slide forward. Rearward or releasing movement of the slide is caused by a spring 14 which also engages said pin 10.

Inside the camera the second pin 11 engages a pivoted arm 15 which carries a shutter 16 adapted to close a window 17 through which the head only of the film pawl 5 extends into the film casette and operates the film in a known manner.

When the casette is attached to the camera as in Figure 1 the slide 9 is moved forward, the film pawl is automatically moved into film engaging position as shown and the shutter 16 is opened. When the casette is removed as in Figure 2 the spring 14 moves the slide rearward, the film pawl is automatically moved out of film engaging position and the shutter is closed. In the closed position of the shutter only the head of the pawl 5 projects between the edges of the shutter and the window 17 as shown in Fig. 2.

The disclosed mechanism is very simple and efficient in operation and prevents mistakes and troubles which may result from manual operation of the film feeder.

I claim:—

1. A photographic camera including a film casette removably attached to the camera and containing photographic film, a film operating member within the camera projecting into the casette in operative position to engage and operate the film when the casette is attached to the camera, mechanism within the camera for automatically moving the film engaging member out of film operating position when the casette is removed from the camera, said mechanism including means adapted to be contacted by the casette when it is attached to the camera for automatically moving the film engaging member back into film operating position.

2. In combination, a photographic camera, a film casette containing photographic film adapted to be attached to and removed from the camera, a film operating pawl within the camera projecting into the casette to engage and operate the film when the casette is attached to the camera, mechanism within the casette for moving the film pawl into and out of film operating position, a spring within the camera for actuating said mechanism to move the film pawl out of film operating position when the casette is removed from the camera, and a pin included in the said mechanism and adapted to be engaged by the casette when the latter is attached to the camera to actuate the said mechanism to move the film pawl back into film operating position.

3. In combination, a photographic camera, a film casette containing photographic film and adapted to be removably attached to the camera, a film operating pawl within the camera projecting through an opening therein for engaging and operating the film when the casette is attached to the camera, a shutter movably mounted upon the camera for closing said opening, mechanism including a spring for automatically moving the film pawl out of film operating position when the casette is removed from the camera and for simultaneously therewith moving said shutter to close the said opening, said mechanism including means projecting from the camera and adapted to be engaged by the casette when the latter is attached to the camera to actuate the said mechanism to open the shutter and move the film pawl back into operating position.

4. In combination, a photographic camera, a film casette containing photographic film and adapted to be removably attached to the camera, a film operating pawl within the camera, projecting into the casette to engage and operate the film when the casette is attached to the camera, a slide within the camera, means pivoting the film pawl to the slide, a spring for moving the slide in one direction to move the film pawl out of film operating position when the casette is removed from the camera and a pin on the slide projecting from the camera and adapted to be engaged by the casette when the latter is attached to the camera for moving the slide in the opposite direction to move the film pawl back into film operating position.

5. In combination, a photographic camera, a film casette containing photographic film and adapted to be removably attached to the camera, a film operating pawl within the camera having a head projecting therefrom through an opening therein into operative engagement with the film in the casette when the latter is attached to the camera, a slide within the camera, a shutter within the camera to close said opening, means operatively connecting the said pawl and shutter to the slide, a spring for actuating the slide to move the pawl and shutter into non-operating and closed positions respectively when the casette is removed from the camera, said means including a member adapted to be contacted by the casette when the latter is attached to the camera to actuate the slide to open the shutter and move the pawl back into film operating position.

HELMUT BECKER.